United States Patent [19]

Wanner et al.

[11] 4,097,176
[45] Jun. 27, 1978

[54] PARTICLE-ASPIRATING ACCESSORY FOR A HAMMER DRILL

[75] Inventors: Karl Wanner, Echterdingen; Wilbert Reibetanz, Leinfelden; Manfred Bleicher, Leinfelden; Herbert Wiesner, Leinfelden, all of Germany

[73] Assignee: Robert Bosch GmbH, Stuttgart, Germany

[21] Appl. No.: 725,446

[22] Filed: Sep. 22, 1976

[30] Foreign Application Priority Data

Oct. 28, 1975 Germany .................. 2548100

[51] Int. Cl.² ......................................... B23B 51/06
[52] U.S. Cl. .................................. 408/56; 408/68; 408/112; 408/241 G; 175/213
[58] Field of Search .............. 408/18, 76, 56, 58, 408/67, 68, 241 G, 59, 112, 115; 175/209–213; 51/170 EB, 170 MT

[56] References Cited

U.S. PATENT DOCUMENTS

| 994,430 | 6/1911 | Tunks | 408/241 G |
| 2,339,324 | 1/1944 | Fischer | 408/112 X |
| 2,870,993 | 1/1959 | Jahnke | 175/209 |
| 2,994,235 | 8/1961 | Rise | 408/112 |
| 3,850,254 | 11/1974 | Hirdes | 175/213 |

Primary Examiner—Leonidas Vlachos
Attorney, Agent, or Firm—Michael J. Striker

[57] ABSTRACT

A hammer drill is provided with an accessory that is rotatably supported on the chuck of the drill and has a handle fixed to the support rotatable on the drill chuck. Structure is provided forming a throughgoing passage extending from the tool through the handle to the outer end of the handle and a flexible conduit is connected to this handle at the outer end thereof for drawing gas and particles from the tool through the passage. The structure may surround an intermediate portion of the tool at the radial opening of an axial bore through the tool so that particles and the like can be aspirated directly through the tool. Alternately a telescoping tube is provided connected at its rear end to the passage at the support and at its front end to a cup through whose base the drill passes, so that this cup is pressed against the workpiece during the drilling operation.

5 Claims, 2 Drawing Figures

PARTICLE-ASPIRATING ACCESSORY FOR A HAMMER DRILL

CROSS-REFERENCE TO RELATED APPLICATIONS

This application is related to the commonly assigned and copending applications Ser. Nos. 574,715 and filed May 5, 1975, now U.S. Pat. No. 3,995,703 and 749,034, filed Dec. 9, 1976 by Karl Wanner and K. Wanner et al, respectively.

BACKGROUND OF THE INVENTION

The present invention relates to a hammer drill. More particularly this invention concerns an accessory for aspirating chips and the like produced during a boring or similar operation by a drill.

When boring with a hammer drill or the like frequently considerable masses of particles are produced. These particles either fall down near the boring site, or dissipate through the air. In particular with a hammer drill a considerable cloud of such particles and dust can result which not only obscures the operator's view of the working location, but can also damage the drill by entering bearings and the like. Furthermore, this often highly abrasive dust can cause injury to the operator's eyes.

It is known to provide an aspirating device for sucking in these particles as they are produced. Such a known system comprises a trough arrangement which is hung on the bit or tool in the chuck of the drill and connected to the drill by a telescoping arrangement that presses away from the drilling implement. A flexible conduit is connected directly to this trough and extends to the inlet of a vacuum device. Such an arrangement operates with some efficiency, but nonetheless has the disadvantage that requires the operator to use two hands to transport his drill from location to location and makes the drill rather unwieldy to use.

SUMMARY OF THE INVENTION

It is therefore an object of the present invention to provide an improved accessory useable on a drill.

Another object is to provide an improved accessory for aspirating drill chips or similar particles from adjacent the tool of a drill.

Yet another object is the provision of such an aspirating device which does not require two-handed carrying or transporting of the drill, and which in no way impairs the efficiency of the drill or the ease with which it is used.

These objects are attained according to the present invention in an arrangement wherein an accessory has a support securable to the boring implement and a handle fixed on the support and having an outer end turned away from the support and from the implement. The implement can thus be stabilized by means of the handle. Structure is provided in the accessory forming a throughgoing passage extending from the tool through the handle to the outer end of this handle. Means including a flexible conduit is connected to the handle at the outer end thereof for drawing gas and particles from the tool through the passage. Thus it is possible to hold the drill during the drilling operations by means of the auxiliary handle formed on the accessory and readily to transport the drill from place to place simply by carrying it with the handle that is connected at its end to a flexible conduit leading to the vacuum.

According to other features of the present invention, the support is rotatably secured on the chuck that carries the tool, normally a drill bit. This support is formed with a nipple directed axially parallel to the axis of the tool. The structure is engaged with this nipple and extends toward the tool.

In accordance with yet another feature of this invention the tool itself is formed with an axially throughgoing passage that opens radially adjacent the chuck. The structure comprises a collar fitting snugly around the tool while allowing the same to rotate, and formed with a radially inwardly open groove constituting part of the passage at the radial opening of the bore in the tool. Thus, turnings, particles, and the like can be aspirated directly through the tool.

According to another feature of this invention, the structure comprises a cup opening away from the implement at the tool, and a telescoping tube connecting this cup with the handle and mounted on the above-mentioned nipple. This telescoping tube is formed of a pair of synthetic-resin telescoping tube sections pushed apart by a spring and surrounded by a tight cuff. The cup is formed with a central collar in which is provided a hardened steel ring through which the tool engages. The front end of the tube lies in the same plane as the front edge of the cup so that the accessory will lie flat against the workpiece once drilling has commenced. Such an arrangement is particularly useable with a normal helical-groove drill bit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

SPECIFIC DESCRIPTION OF THE PREFERRED EMBODIMENTS

Figure 1:
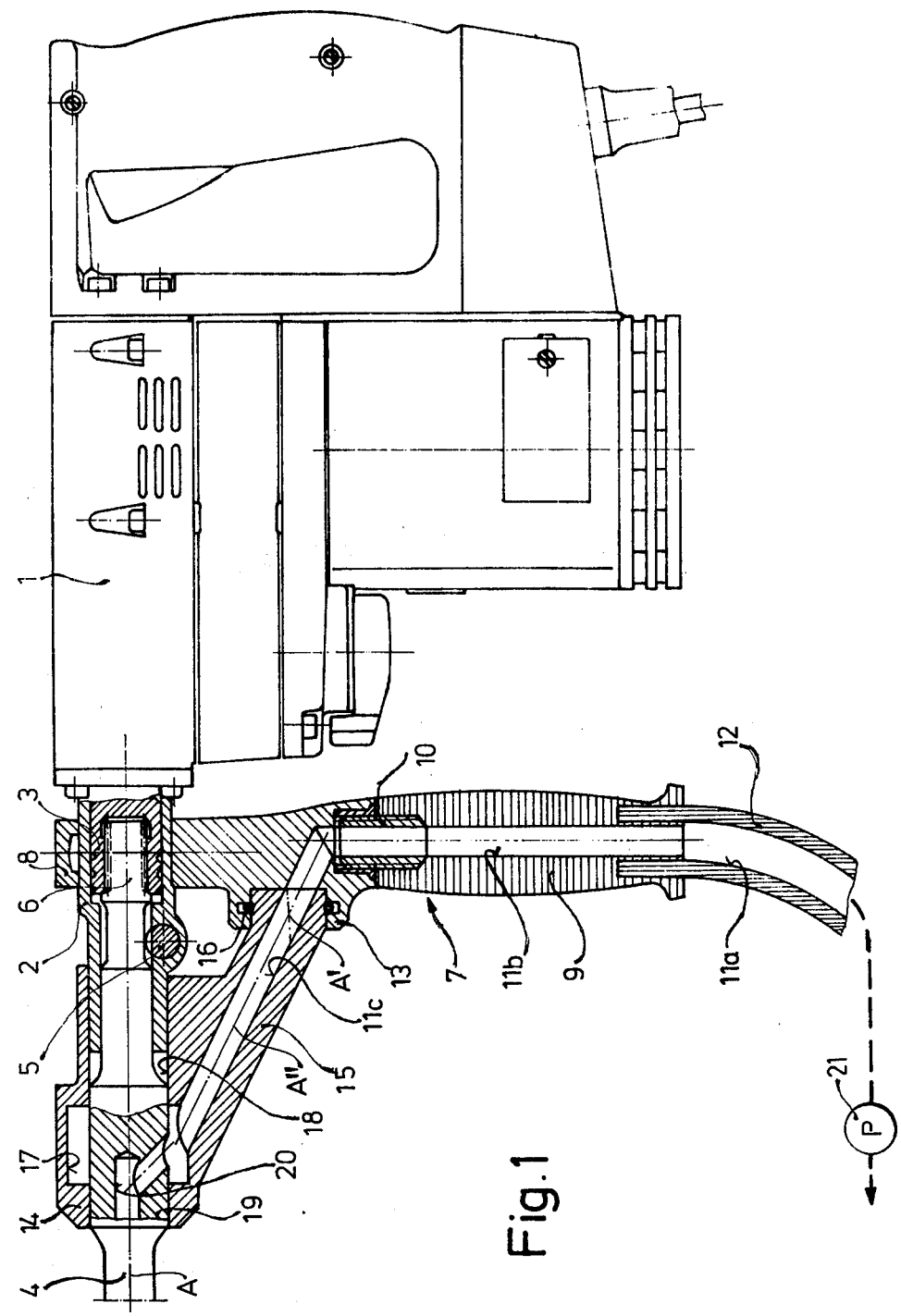
FIG. 1 is a side view partly in section of a drill equipped with an accessory according to this invention.

The arrangement as shown in FIG. 1 is adapted to be used with a hammer drill 1, such as described in the first-cited copending application. It is provided with a chuck 2 having a tool-holding head 3 that is connected to the shank 6 of a tool 4 that is also held in the chuck 2 by means of a pin 5 such as described in the second-cited copending application. An accessory 7 according to this invention comprises a ring portion 8 of metal, preferably case aluminum or the like, secured to a synthetic-resin handle 9 by means of a threaded sleeve 10. A flexible tube 12 is fastened to the lower end of the handle 9 at one end and at its other end to a vacuum pump 21. The interior of the tube forms a first passage section 11a which communicates with a passage section 11b extending upwardly through the handle 9 and support 8. This support 8, which is rotatable about the axis A of the chuck 2, is formed with a nipple 13 into which is fitted structure 15 forming a third passage section 11c. The nipple 13 is centered on axis A′ parallel to the axis A, and the passage section 11c in the structure 15 extends at an angle of approximately 30° to the axis A. An O-ring 16 seals the nipple 13 relative to the element 15.

In addition the element 15 is formed with a cylindrical bore 18 and is provided at its front end with a collar 14. The internal diameter of the bore 18 is the same as the outer diameter of the front portion of the chuck 2 and of an enlarged region 19 on the tool 4. In addition, this tool 4 is formed with an axial bore 20 opening radially into a radially inwardly open groove 17 in the collar 14. The passage 11c communicates with this groove 17.

Thus it is possible for particles, dust and the like produced at the tip of the tool 4 to be aspirated through the passage 20, then through the tube selections 11a–11c into the pump 21. Meanwhile the tool 4 can both be rotated about the axis A and reciprocated limitedly along this axis A while in no way interfering with the aspiration. The accessory 7 is so securely mounted on the chuck 2 that it is possible to carry the drill 1 by means of the handle 9, and to stabilize the drill 1 by means of the handle 9 during use of the drill. Since the entire accessory 7 can rotate on the chuck 2 about the axis A it is possible to vary the angle between the two drill handles and allow the operator to assume whatever position is most comfortable for him or her.

Figure 2:
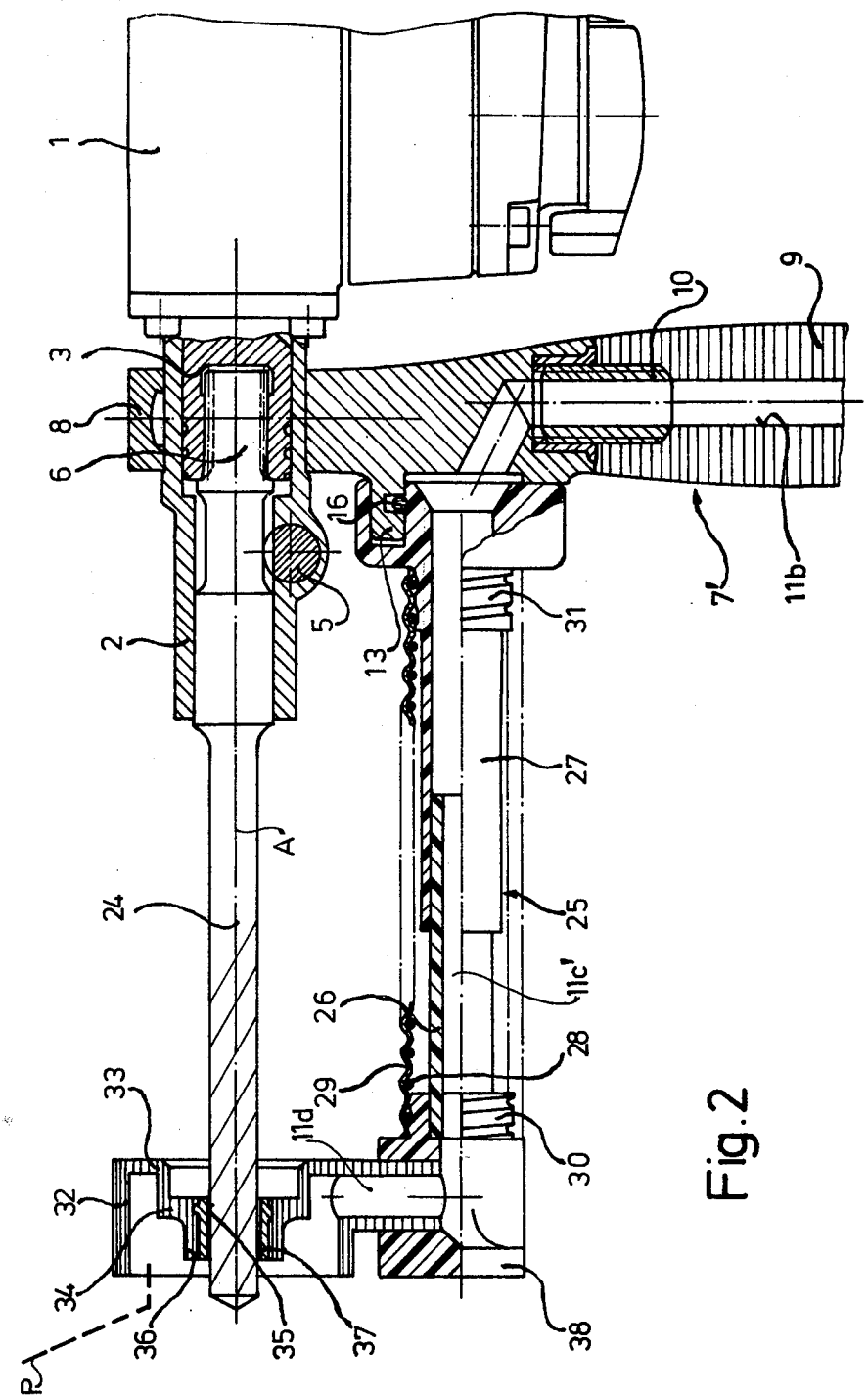
FIG. 2 is a similar view of another embodiment of the accessory according to the invention.

In the arrangement of FIG. 2 identical reference numerals are used for identical structure. Here, however, the tool 4 is replaced by a standard helical-groove drill bit 24. Mounted on the nipple 13 is the rear end of a tube section 27 of a tube 25. This tube section 27 engages within and around the collar-like nipple 13 and another tube section 26 of the tube 25 is telescopingly engaged inside the tube 27. Threaded formations 30 and 31 on the sections 26 and 27, respectively, are engaged by the ends of a compression spring 28 over which lies a flexible cuff 29 so that the sections 26 and 27 are normally urged apart axially, and a tight seal is created between them.

At its front end the accessory 7' of FIG. 2 has a cup 32 with a base 33 formed with a backwardly open cup-shaped depression 34 itself forming a collar 36 engaging around the bit 24. The hole 35 defined by this collar 34 is lined with a steel sleeve 37 so as to minimize wear of this part. The interior of the cup 32 communicates with the passage section 11c' formed by the tube 25 via a passage section 11d' extending perpendicular to the axis A of the tool 24. In addition the tube 25 has a front end 38 with a face that lies exactly in plane P formed by the front edge of the cup 32 and extending perpendicular to the axis A. The cup 32 is made of a glass-fiber reinforced synthetic resin such as Nylon.

Thus it is possible for the entire front end of the accessory 7' to move axially toward and away from the drill 1. In use the operator manually pulls back the cup 32, thereby compressing the spring 28. Drilling is commenced and the cup 32 is allowed to move forward and press against the workpiece around the bit 24. This insures very effective aspiration of any particles generated by the drill, and the recess 34 in the base 33 of the cup 32 allows this arrangement to push all the way back over the chuck 2 if necessary. The front end of the sleeve 37 is spaced from 2 mm to 5 mm from the plane P in order to prevent this portion from striking the workpiece.

With the system according to the present invention it is therefore possible effectively to aspirate particles produced by a drill directly at the drilling site. In addition the structure is so arranged that the drill itself can be carried by the accessories, so that the considerable force that would be exerted on the drill by pulling along the pneumatic hose connected to the compressor 21 is absorbed in the very handle by which the drill is carried and maneuvered.

It will be understood that each of the elements described above, or two or more together, may also find a useful application in other types of structure differing from the types described above.

While the invention has been illustrated and described as embodied in a hammer drill, it is not intended to be limited to the details shown, since various modifications and structural changes may be made without departing in any way from the spirit of the present invention.

Without further analysis, the foregoing will so fully reveal the gist of the present invention, that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In combination with a boring implement having a chuck adapted to hold a tool having an axis, an accessory comprising:
   a collar surrounding said chuck;
   an elongated handle fixed on said collar and having an outer end turned away from said collar and from said implement, whereby said implement can be stabilized by means of said handle;
   structure forming a throughgoing passage extending from said tool through said handle to said outer end thereof and including
      a nipple extending in a direction parallel to said axis with said passage opening at said nipple in said direction,
      a cup open away from said implement at said tool and having an interior connected to said passage, and
      a telescoping tube extending between said cup and said nipple and formed of a pair of telescoping tube sections, a compression spring braced between said sections, and a tubular cuff connected to both of and surrounding said sections; and
   means including a flexible conduit having an end portion attached to and in line with said handle at said outer end for drawing gas and particles from said tool through said passage.

2. The accessory defined in claim 1 wherein said cup has a front edge lying substantially in a plane perpendicular to said tool axis, said tube having a front face also lying in said plane.

3. The accessory defined in claim 1 wherein said collar is metallic and said handle is of synthetic-resin material, said accessory further comprising means for threadedly securing said handle to said collar.

4. The accessory defined in claim 1 wherein said cup surrounds said tool and is formed with a central hole through which said tool passes.

5. The accessory defined in claim 4 wherein said structure is provided in said cup at said hole with a guide sleeve of hard metal.

* * * * *